United States Patent [19]

Urayama

[11] 3,887,773

[45] June 3, 1975

[54] AUTOMATIC TELEPHONE ANSWERING APPARATUS

[75] Inventor: Yuji Urayama, Yokohama, Japan

[73] Assignee: Victor Company of Japan, Ltd., Yokohama, Japan

[22] Filed: May 14, 1974

[21] Appl. No.: 469,872

[30] Foreign Application Priority Data

May 17, 1973 Japan .......................... 48-57221

[52] U.S. Cl. ........................ 179/6 R; 179/100.1 VC

[51] Int. Cl. ............................................. H04m 1/64

[58] Field of Search .................. 179/110.1 VC, 6 R

[56] References Cited

UNITED STATES PATENTS

| | | | |
|---|---|---|---|
| 3,445,600 | 5/1969 | Todd | 179/6 R |
| 3,688,043 | 8/1972 | Konno | 179/6 R |
| 3,766,321 | 10/1973 | Sato | 179/6 R |

*Primary Examiner*—Terrell W. Fears
*Attorney, Agent, or Firm*—Owen, Wickersham & Erickson

[57] ABSTRACT

An automatic telephone answering apparatus coupled to a telephone set for cooperative operation therewith comprises a device operating upon receiving a call when the called person is absent to send an answering message prerecorded on an answering tape to the caller and then recording any incoming message from the caller, a line connecting circuit operating in response to a call signal to connect the apparatus to the telephone line, and a circuit for holding the line connecting circuit in its operative state with respect to the above mentioned call until the answering tape returns to a predetermined starting position at which the answering message starts.

8 Claims, 4 Drawing Figures

AUTOMATIC TELEPHONE ANSWERING APPARATUS

BACKGROUND OF THE INVENTION

This invention relates generally to an automatic telephone answering apparatus, and more particularly to an automatic telephone answering apparatus coupled to a telephone set and operating when a call is received while the called party is absent to send to the calling party or caller an answering message and then to record any incoming message from the caller. More specifically, the invention relates to an apparatus of this character which, in the case when the apparatus is in the process of answering with respect to one caller sending the answering message, and that caller hangs up before the answering tape reaches a predetermined message starting position, operates until the answering tape reaches that message starting position to notify any second caller that the telephone is busy.

In an automatic telephone answering and recording apparatus in general use at present, when a caller cuts off his telephone during recording, the apparatus is placed in a stnadby or ready state for awaiting the next call, and when the caller's receiver is replaced on its cradle during answering operation, the called telephone set is disconnected from the telephone line, and the apparatus is placed in ready state after an endless tape for answering, which is the recording medium for recording thereon the answering message, has made one circuit of its travel.

This endless tape can be freely selected by the owner of the apparatus. While a tape of a recording capacity of the order of 20 seconds is ordinarily used, endless tapes of recording capacities of the order of 3 minutes, 6 minutes, and 12 minutes are used in cases where the answering messages are long. If, in the case where an endless tape of such a large recording capacity is used, a caller cuts off his telephone during the answering operation, a certain time will be required for this answering tape to return to its answering starting position (head position).

Then, if another (third) person calls the same telephone during this time, the call bell of this telephone set will operate, but the telephone will remain disconnected from the above described apparatus. For this reason, the caller hears the calling tone but, since there is no answer, becomes convinced that the called party is absent and becomes disclined to making a second call. That is, a problem accompanying an ordinary automatic telephone answering and recording apparatus has been that it causes a caller who has called the telephone set operating cooperatively with this apparatus during the operational travel of the endless tape for answering to become convinced that the called party is absent.

SUMMARY OF THE INVENTION

It is a general object of the present invention to provide a novel and useful automatic telephone answering apparatus in which the above described problem has been solved.

A specific object of the invention is to provide an automatic telephone answering apparatus so adapted that, in the case where a caller replace and hangs up his receiver and cuts off his telephone at an intermediate point in the answering operation, the called telephone is placed in the line-busy state with respect to a succeeding caller until the apparatus returns to its standby or ready state for answering.

Another object of the invention is to provide an automatic telephone answering apparatus in which the telephone line is open-circuited upon resetting of an answering message recording tape to its message starting point during the operative state of means for detecting and memory storing an indication of the replacement by the caller of his telephone receiver on its cradle to terminate the call.

Still another object of the invention is to provide an automatic telephone answering apparatus in which means for closing the telephone line prior to and upon completion of the resetting of the answering message recording tape to its message starting point is operated by respectively different first and second activating means, and the operation of the second activating means with respect to the telephone line closing means is suppressed interrelatedly with the operation of detecting and memory storing an indication of the replacement by the caller of his receiver on its cradle to terminate the call.

A further object of the invention is to provide an automatic telephone answering apparatus which can be connected to and disconnected from the telephone line in a stable and positive manner without misoperation.

Other objects and further features of the invention will be apparent from the following detailed description when read in conjunction with the accompanying drawings.

DETAILED DESCRIPTION

Figure 1:
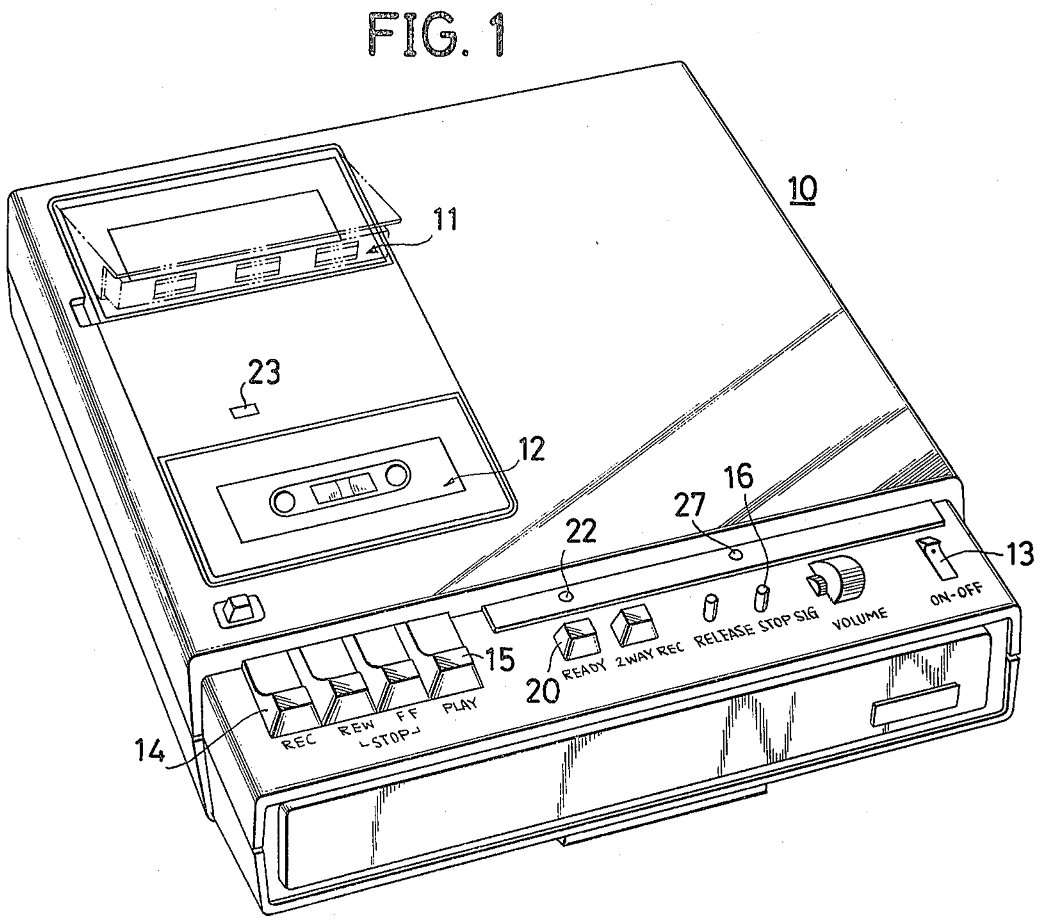
FIG. 1 is a perspective view showing the exterior of the top, front, and left side of one example of an automatic telephone answering and recording apparatus according to the invention.

First, the operation of an automatic telephone answering and recording apparatus 10 in which a telephone line connection control device, constituting an essential part of the device of this invention, will be described in outline form in conjunction with FIGS. 1, 2A and 2B. In the automatic telephone recording and answering apparatus 10 (hereinafter referred to simply as apparatus), an endless-tape cassette 11, on which a required outgoing answering message has previously been recorded and a still unrecorded cassette 12 having finite ends for recording incoming messages are inserted in respective loading positions.

When a power supply switch 13 is switched on, a power supply circuit X1 is activated, and a DC voltage is supplied to the circuits described hereinafter. Then, a recording button 14 and a playing (reproducing) button 15 are pushed down, and a stop signal recording button 16 is further depressed, whereupon a switch S1 is closed, and a stop signal recording controlling circuit X2 operates for a predetermined time. An oscillation output from the circuit X2 passes through relay contact points Sh1 and Sg1 and is supplied to a playing head H3 for incoming messages of a head assembly 17 for the incoming message side.

Furthermore, the output of the circuit X2 passes through a line *a* and is applied to and activates a control relay 18 on the incoming message recording side, whereby relay contact points Sb1 and Sb2 are closed. Consequently, the output of the circuit X1 passes through the relay contact points Sb1 and Sb2 and is applied to and activates a sensor operating circuit X3. The output of this circuit X3 activates a release circuit X4, whereby a solenoid SOL2 of the incoming message recording side is activated. Furthermore, a DC motor 19 for driving at the same time a capstan provided in the vicinity of the incoming message recording and answering cassettes is started.

In addition, the output from the circuit X1 is applied by way of the relay contact points Sb1, Sb2, and Sj1 to a recording amplifying circuit X5 and a bias generating circuit X6. As a consequence, the cassette tape of the incoming message recording cassette 12 is clamped between and driven by a pinch roller and the capstan (both not shown). At the same time, the output signal of the circuit X2 is recorded as a stop signal for a specific time (approximately 10 seconds) on this tape by the incoming message recording head H3.

Upon completion of this recording of the stop signal, the ready button 20 is depressed, whereupon a relay contact point Se1 is closed, and the output of the circuit is supplied to and activates a signalling answering circuit X7. Consequently, an answering relay 21 is activated, and its relay contact point Sa1 is changed, whereby the relay is self held. Accordingly, an answering side solenoid SOL1 and the motor 19 are operated, and the endless tape within the answering cassette 11 is clamped and driven by the pinch roller and capstan. When, during the travel of the endless tape, a sensor (not shown) detects a sensing foil bonded at a specific position of the tape, the circuit X3 operates to generate pulse signals, which are supplied to the above mentioned answering circuit X7. As a consequence, the relay contact point Se1 is opened, and the relay 20 is rendered inoperative. Similarly, both the solenoid SOL1 and the motor 19 are rendered inoperative. Accordingly, the endless tape is stopped in a state wherein it has been made ready for new recording. In this state, a ready lamp 22 is lit to indicate that the apparatus 10 has assumed its ready mode.

The operation in the case when, in this mode of operation, a signal arrives will now be described. When a signal arrives at connection terminals L1 and L2, this signal flows through a closed circuit from the terminal L2, through a relay contact point Sd1, an arriving signal receiving circuit X8, a capacitor, and the terminal L1, whereby the circuit X8 is activated, and the relay contact point Se1 carries out switching operation in synchronism with the call signals. When a predetermined number of call signals arrive, and the relay contact point Se1 undergoes the predetermined number of switching operations, the circuit X7 operates, and a signal for starting is sent for approximately 1 second along a line *b* to be applied to a line connecting circuit X10, which thereupon operates. Consequently, a line closing relay 26 operates, and the relay contact point Sd1 is switched, whereby the apparatus 10 is connected to the telephone line. Furthermore, a lamp 27 is lit to indicate that the apparatus is operating.

As another result of the operation of the circuit X7, the relay 21 operates and is held in operative state, whereby the operative state of the circuit X7 is self-held. As a result of the operation of the relay 21, the relay contact point Sa1 is switched, and the solenoid SOL1 and motor 19 are placed in their operative states. As another result of the operation of the relay 21, a +B power supply voltage is applied by way of a line *c* to the circuit X10. The circuit X10 is thereupon held in its operative state even after the starting signal from the line *b* has been turned off, and the apparatus 10 remains connected to the telephone line. As still another result of the operation of the circuit X7, a signal arrival lamp 23 is lit, and, furthermore, a reproducing amplifying circuit X9 is placed in its operative state.

Consequently, the endless tape on the answering side which is in the ready mode starts to travel, and playing of the answering message is carried out by a recording-/reproducing head H1 incorporated within an answering head assembly 24. The resulting reproduced signal from the head H1 is supplied to and amplified by the amplification circuit X9, and the resulting output signal thereof passes through relay contact points Sc1 and Sj2 and passes further through a coupling transformer T1. Then, this signal passes through the relay contact point Sd1 switched and connected as described above and the terminal L2 and is sent to the telephone line as an answering message conveying information relating to the absence of the called person to the telephone caller.

When the outgoing message containing information relating to the absence of the called person has been sent, and the endless tape within the cassette 11 has made one cycle of travel to bring the sensing foil to the position of the sensor, the sensor operating circuit X3 operates similarly as mentioned above, and the output signal therefrom is supplied to the circuit X7 through a line *d*, to a control circuit X14 through a line *e*, and to a beep-tone generating circuit X11 through a line *f*, whereupon these circuits are activated. The output signal of the circuit X11 is sent by way of the transformer T1 to the telephone line side and is sent as a beep tone to the telephone caller.

As another result of the operation of the circuit X7, the self holding state of the relay 21 is terminated, and the solenoid SOL1 is rendered inoperative. The travel of the endless tape is again stopped at the ready position for recording. Furthermore, as a result of the operation of the circuit X14, the relays 18 and 25 are held in their operative states, and the relay contact points Sb1, Sb2, Sc1, and Sc2 are changed over. As a result, the motor 19 continues to rotate, and the solenoid SOL2 newly operates. The cassette tape of the cassette 12 on the incoming message recording side starts to travel, and the apparatus 10 assume the state for recording the incoming message.

Then, the audio signal of the incoming message sent from the telephone caller is transmitted through the telephone line and arrives at the terminal L2 and is thence transmitted by way of the relay contact point Sd1 and the transformer T1. This signal is further transmitted through the relay contact point Sj2 and relay contact points Sc1 and Sc2 in changed over state to the recording amplification circuit X5. The amplified voice signal from the circuit X5 is supplied by way of relay contact points Sh1 and Sg1 to the recording/reproducing head H3 of the head assembly 17. At the same time, a bias current from the bias generating circuit X6 is supplied to the head H3, and the content of the message spoken by the telephone caller is recorded on the still unrecorded cassette tape of the cassette 12.

Furthermore, the output of the circuit X5, is supplied to a voice activity control (VAC) circuit X13 producing as output a DC signal in accordance with the existence or nonexistence of an input signal. The output of the circuit X13 is applied to the control circuit X14, which is thereby held in its operative state, and the apparatus 10 is held in the mode for recording an incoming message. The output signal of the circuit X14 is applied to the telephone line connection circuit X10 through a line *g*, whereby the circuit X10 is remained to be in the operating state following to the answering operation. By controllably activating the monitor switching circuit X12 at this time, it is possible by means of a loudspeaker 28 to monitor the content of the incoming message from the caller, which message is being recorded at the moment.

When the telephone caller has completed his oral statement of his message and has replaced the telephone receiver on its cradle (i.e., has "hung up"), the circuit X5 stops sending an output signal to the VAC circuit X13, the output signal of which is reduced to zero after approximately 10 seconds. Consequently, the circuit X14 is rendered inoperative, and the operations of the relays 18 and 25 are terminated. Furthermore, a noise signal generated by the hanging up action of the calling party is transmitted through a line *h*, whereupon a calling party control (CPC) circuit X15 operated, and the circuit X10 is rendered inoperative. The relay 26 thereupon stops operating. In areas where a CPC system is used, a DC potential is disappeared during a period of approximately 500 ms. when a telephone line is connected and when it is disconnected, whereby clicking noise is generated. The motor 19 and the solenoid SOL2 are both rendered inoperative, whereby the apparatus is uncoupled from the telephone line and is restored to its original ready state. While the lamp 27 is extinguished at this time, lamps 22 and 23 continue to be lit to indicate that there has been an arriving signal at the apparatus 10.

Next, the operation of the apparatus 10 in the case of remote control thereof through the telephone line will be described. The apparatus 10 has three selectors (not shown) which are provided in specific positions and are adjustably set to selectively detect pair tones respectively composed of high tones and low tones generated when, at a remote calling point, the numeral buttons from zero to 9 of a so-called touch-tone telephone set are depressed in predetermined sequences.

When the owner of the apparatus 10 sends a call signal from a remote point to the telephone set connected to the apparatus 10, the apparatus 10 operates in the same manner as in the case described above. The endless tape on the answering side is driven through one cycle of travel, transmitting the answering message and the beep tones to the caller. Thereafter, the apparatus 10 assumes the ready state for recording.

When, with the apparatus 10 in this mode, the owner successively sends signals of three predetermined digits, these signals are transmitted through the telephone line L1 and L2 to the apparatus 10. These three-digit signals are thereupon transmitted by way of the transformer T1 to the apparatus 10, by way of the transformer T1 to the apparatus 10, by way of a line *j* to a limiter amplifying circuit X16 to be amplified, and are then supplied to an AC to DC conversion circuit X17. In this circuit X15, high tones and low tones are selected, and in accordance with the combinations thereof, numerals of from zero to 9 are read. The circuit X17 comprises a plurality of band-pass filters, amplification circuits, rectification circuits, DC amplification circuits, and other components.

The AC to DC conversion circuit X17 produces output signals, which are suitably combined in groups of three or four and supplied to a selector circuit X18 of the succeeding stage. From this circuit X18, signals of the first, second, and third digits are respectively supplied through line *j*, *k*, and *l* to a first-digit control circuit X19, a second-digit control circuit X20, and a third-digit control circuit X21.

When the output signal of the circuit X18 appears in the line *j*, the circuit X19 is activated, and an output signal from the circuit X19 is continuously applied to the circuit X20 for approximately 5 seconds. When, during this period, an output signal from the circuit X18 appears in the line *k*, the circuit X20 is activated, and an output signal from the circuit X20 is continuously applied to the circuit X21 for approximately 5 seconds. When the output signal of the circuit X18 is supplied through the line *l* to the circuit X21 during the output signal of the circuit X20 being supplied to the circuit X21, the circuit X21 is activated and the output signal of the circuit X21 is supplied to the call-back controlling power supply circuit X22. The circuit X22 operates after the signal from the circuit X21 stops arriving to supply a voltage to the above mentioned circuits X19, X20, and X21, which thereafter are placed in modes for operating independently in accordance with the arrival of their corresponding digit signals.

When the signals of the three digits successively arrive as mentioned above, the output signal of the circuit X21 activates a rewind control circuit X23, and the solenoid SOL2 on the incoming message recording side is rendered inoperative, whereby the pinch roller ceases to press against the capstan. At the same time, a solenoid SOL3 for driving the rewind mechanism is rendered operative. As a consequence, rewinding of the tape within the cassette 12 on the incoming message recording side is carried out. At the same time, a relay 29 for changing the apparatus 10 to the incoming message playing mode operates, and relay contact points Sg1, Sg2, Sj1, and Sj2 are respectively switched.

During the rewinding operation, furthermore, the head assembly 17 is lightly contacting the tape which is traveling at high speed. Accordingly, the signal reproduced by the head H3 is applied by way of the relay contact points Sg1 and Sg2 to the reproduction amplification circuit X9. The output of this circuit X9 is transmitted by way of the relay contact point Sj2 and the transformer T1 to the telephone line side, and an audio signal confirming the fact that rewinding is being carried out is sent to the caller at the remote point. The output of the circuit X9 is simultaneously applied to a rewind stopping circuit X24.

The rewinding is carried out to the part where the above mentioned stop signal is recorded. When the head H3 reproduces a stop signal, the circuit X24 is activated, and the rewind control circuit X23 is rendered inoperative. Consequently, the solenoid SOL3 is rendered inoperative, and the rewinding operation stops.

When the circuit X23 is rendered inoperative, the solenoid SOL2 for driving operates, and the cassette tape for message recording is clamped between and driven by the pinch roller and the capstan. Furthermore, a reproduction control circuit X25 is rendered operative by the above mentioned stop signal, and the apparatus is changed to a mode for playing back the recorded incoming message. As a result, the incoming message recorded on the cassette tape for recording incoming messages is transmitted to the owner of the apparatus 10 calling from the remote point.

The control actions and operations which can be carried out by the operator will now be simply described. When, during the above described rewinding operation, the signal of the second digit is sent, the circuit X23 is rendered inoperative, and the apparatus 10 is converted from the rewind mode to the reproducing or playback mode. Furthermore, when the owner sends a signal of the first digit for a short time during the playback operation, the circuit X19 operates and produces an output signal whereby a recording controlling circuit X26 operates, and the circuit X25 is rendered inoperative. As a result, the apparatus 10 is caused by the owner to assume a mode wherein it can record on the tape of the cassette 12 on the incoming message side.

When the owner continues to send the signal of the above mentioned first digit over a long period (2 seconds or more), the circuit X2 operates further, and a stop signal for the tape of the cassette 12 is recorded. For this reason, it is possible to prevent erroneous erasure of the principal incoming message content in next operation by listening to this content in the incoming message cassette 12 and thereafter sending the signal of the first digit over a long period of time thereby to record newly a stop signal. When, with the apparatus in the above mentioned recording mode, the owner, who is the caller, hangs up, the VAC circuit X13 is rendered inoperative after a specific period thereafter similarly as described above, and the circuit X14 is placed in its inoperative state, the apparatus 10 thereupon being placed in the ready mode.

When, with the apparatus in the mode for reproducing the recorded incoming message, the telephone caller sends the second-digit signal, a new message recording (NMR) control circuit X27 operates, whereupon a relay 30 operates, and relay contact points Sj1, Sh1, and Sh2 are switched. As a consequence, the endless tape on the answering side is driven, and, moreover, the recording/reproducing head H1 and the erasing head H2 of the head assembly 24 on the answering side are both rendered operative, whereby a new message is recorded on the endless tape on the answering side. The apparatus 10 reproduces the message thus recorded anew and transmits it to the caller, then being placed in the ready state with the tape in a state of readiness for new recording.

Furthermore, when the signal of the second digit is received with the apparatus 10 in the mode for recording an incoming message, the circuits X20 and X25 operate, and the apparatus is placed in the mode for message playback. When, with the apparatus 10 in the above mentioned message recording state, the signal of the third digit is received, the apparatus is placed in the rewinding mode while this signal is being received and is placed in the message reproducing mode after this signal is no longer received.

The operations of the line connecting circuit X10 and CPC circuit X15 constituting essential parts of the present invention will now be outlined in a generalized manner. First, the operation when the apparatus is in the recording mode of operation, that is, when the circuit X10 is supplied with an output signal from the circuit X14 through the line *g* and is in its operative state, will be considered. In this case, as a result of the operation of the circuit X15 when the calling party hangs up, the circuit X10 is immediately rendered inoperative as described above, and the relay 26 becomes inoperative, whereby the apparatus 10 is disconnected from the telephone line and is restored to its original standby or ready state.

The operation of the apparatus 10 when it is placed in the answering state, that is, when the circuit X10 receives a signal through the line *c* and is thereby rendered operative, will be considered. In this case, the circuit X15 operates in response to the hanging up of the telephone receiver of the calling party, but the circuit 10 continues to be held in its operative state, and the apparatus 10 remains connected to the telephone line. When the endless tape 11 on the answering side completes its travelling in one turn, the input through the line *c* to the circuit X10 as mentioned above is cut off, and, instead, a signal is supplied through the line *g* to this circuit X10. This signal applied through the line *g* to the circuit X10 is grounded by way of the circuit X15 as described hereinafter, and the circuit X10 is rendered inoperative at the instant when the signal through the line *c* is cut off. The apparatus 10, in a state wherein it has been placed in the original ready mode, is disconnected from the telephone line.

For this reason, in the case where another caller sends a call to the telephone set for operating cooperatively with the apparatus 10 immediately after the above mentioned first caller hangs up, a signal in accordance with the calling signal is not transmitted, but a signal signifying that the called telephone set is being used and busy, is sent. Accordingly, the telephone set for operating cooperatively with the apparatus 10 according to the present invention does not indicate to a calling party that the called person is not at home, whereby the aforementioned problem is solved.

Figure 3:
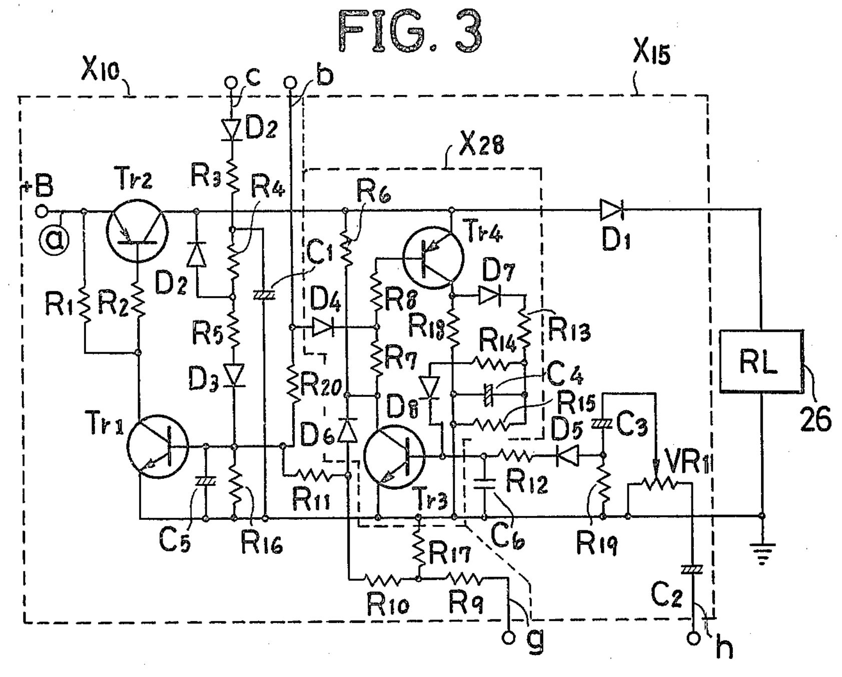
FIG. 3 is a circuit diagram of an embodiment of a telephone line connection control device which constitutes an essential and important part of the present invention.
Figure 2A:
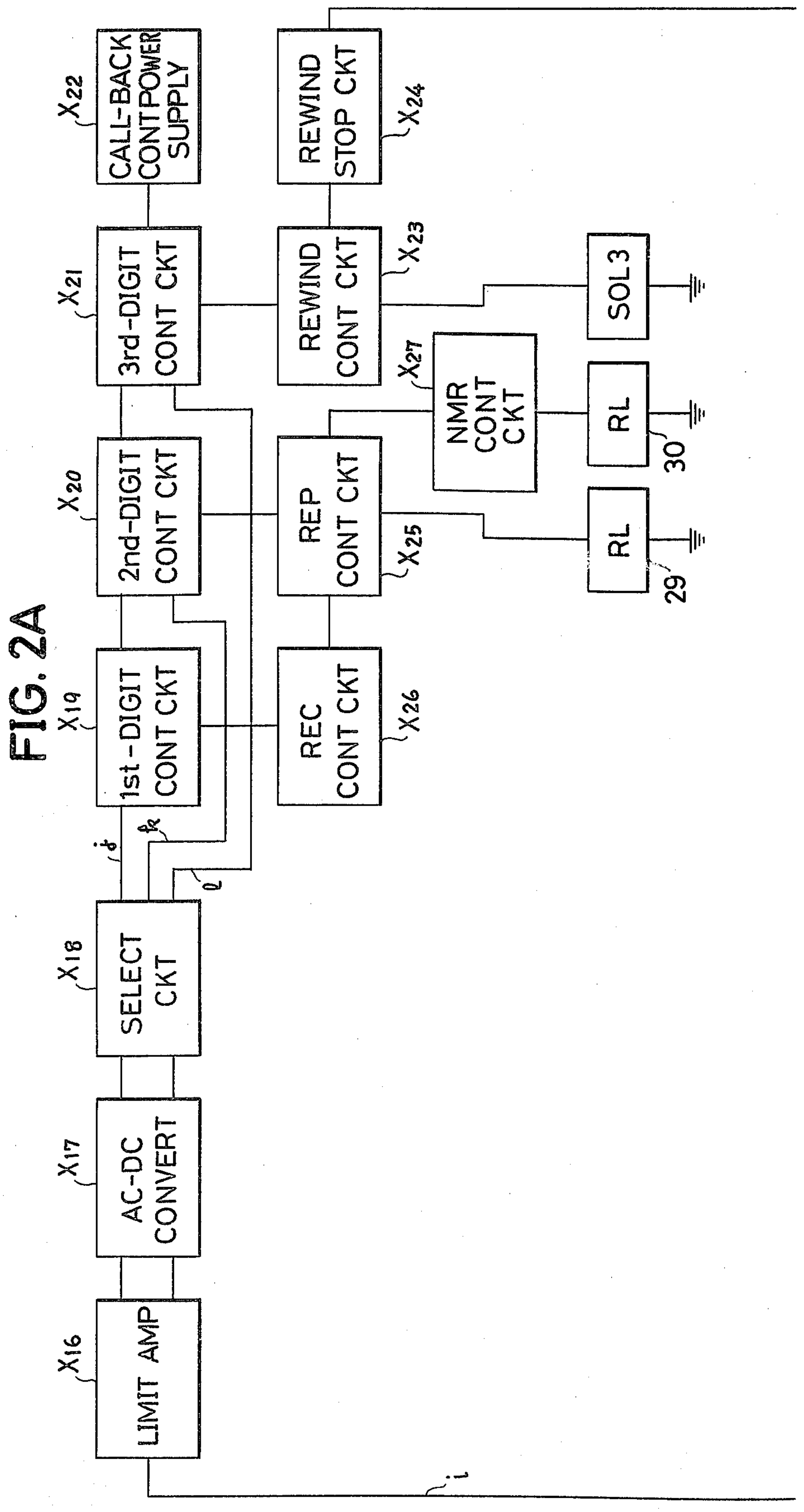
FIGS. 2A and 2B are block diagrams showing the circuit organization of the first embodiment of the apparatus shown in FIG. 1.
Figure 2B:
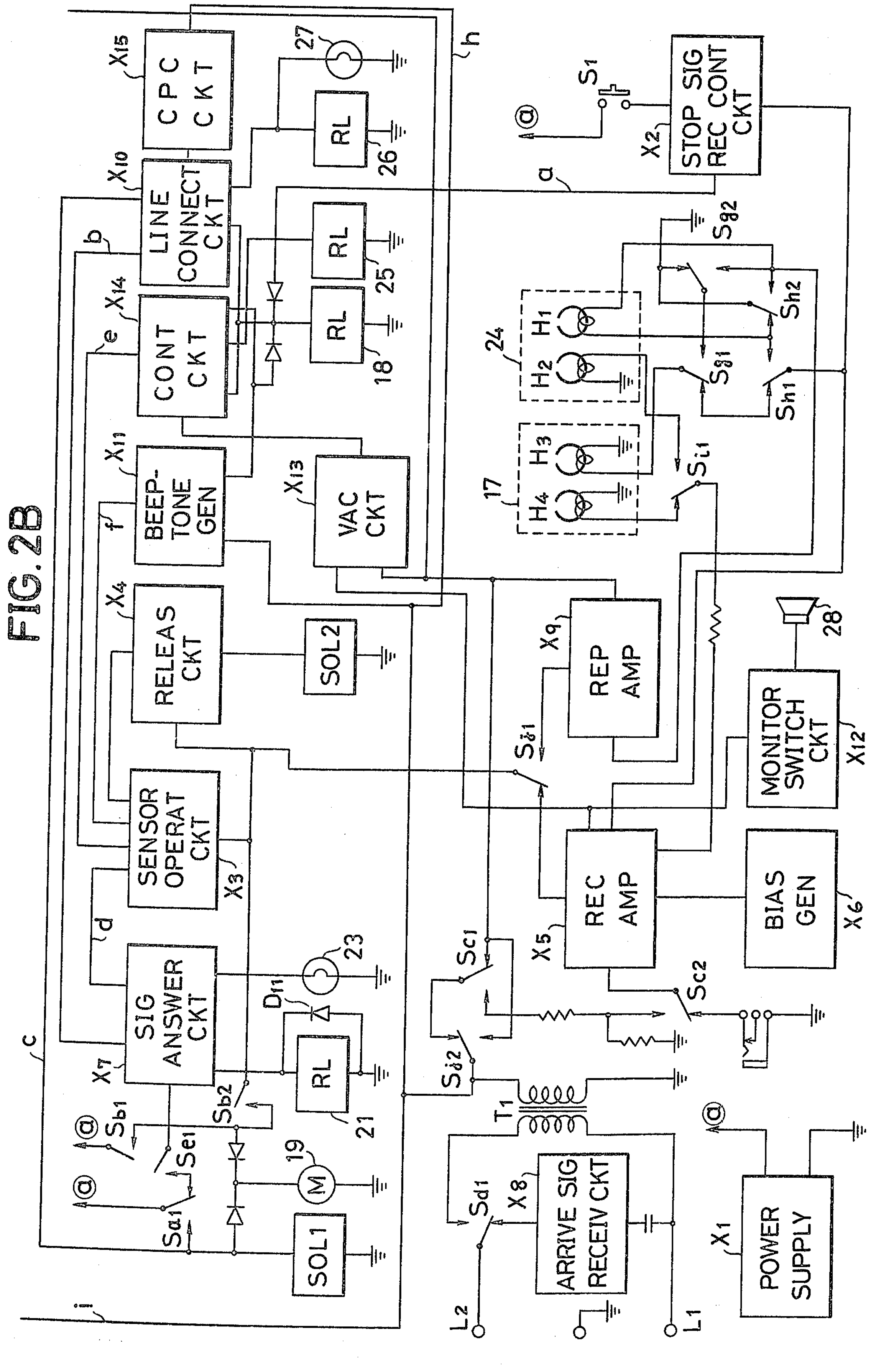

Next, embodiments of specific circuit organization and operation of the line connecting circuit X10 and the CPC circuit X15 will be described with reference to FIG. 3, in which parts which are the same as corresponding parts shown in FIGS. 2A and 2B are designated by like reference numerals, and detailed description of these parts will not be repeated.

When the apparatus 10 is placed in the ready mode as described hereinbefore, the +B power source voltage from the power supply circuit X1 is applied to the circuit X10. With the apparatus 10 in this mode, an NPN transistor Tr1 is in its "OFF" state, and a PNP transistor Tr2 is in its "OFF" state, the +B power source voltage being applied thereto by way of resistors R1 and R2. When a call signal arrives, the call answering circuit X7 operates, and a signal produced as output for approximately 1 second through the line *b* is applied to the circuit X10, in which this signal is applied by way of a resistor R20 to the base of the NPN transistor Tr1, which is thereby rendered "ON." When the transistor Tr1 becomes "ON," the base of the PNP transistor Tr2 is grounded by way of the resistor R2 and the transistor Tr1, whereby the transistor Tr2 becomes "ON." Consequently, the +B power source voltage is applied by way of the transistor Tr2 and a diode D1 to the line connecting relay 26, which thereupon operates, and the relay contact point Sd1 in FIG. 2B is switched. Thus, the apparatus 10 is connected to the telephone line.

At the time when a signal is no longer sent through the line *b*, a signal enters through the line *c* and is applied by way of a diode D2, resistors R3, R4, and R5 and a diode D3 to the base of the transistor Tr1, which is thereby held in the "ON" state, and the relay 26 continues to be in its operative state.

At this answering time, in the CPC circuit X15, an NPN transistor Tr3 is rendered "OFF," and the +B power source voltage passed through the transistor Tr2 is being applied by way of resistors R6, R7, and R8 to a PNP transistor Tr4, which is thereby rendered "OFF." The transistors Tr3 and Tr4 constitute a click noise detecting and storing (memorizing) circuit X28 as described hereafter.

At the time of staring of answering operation a signal passed through the line *b* is being applied by way of a diode D4 and the resistor R8 to the transistor Tr4, which is thereby supplied with the power supply voltage as a result of the transistor Tr2 being rendered "ON" and is held in the "OFF" state also in the case where the transistor Tr3 is rendered "ON" as described hereinafter by a click noise generated in the line *h* at the time when the relay contact Sd1 is changed over by the operation of the relay 26, and the telephone line is connected. For this reason, the circuit X28 is not operated by the noise generated at the time of line connection.

When the apparatus 10 is switched as described above from the answering state to the state for recording an incoming message, the signal which was being applied through the line *c* in the circuit X10 is terminated, and a signal from the control circuit X14 is applied through the line *g*. This signal is applied by way of resistors R9, R10, and R11 to the base of the transistor Tr1. While a certain time is required for the signal to appear in the line *g* after the signal in the line *c* disappears, a charge accumulated in a capacitor C1 is discharged through the resistors R4 and R5 and the diode D3 at the time of switching of the signals, and the transistor Tr1 is supplied with bias voltage. For this reason, the "ON" state of the transistors Tr1 and Tr2 continues without a break. Thus, when the apparatus is in the operational mode for recording incoming messages, the transistors Tr1 and Tr2 are both placed in the "ON" state by the signal through the line *g*.

For this reason, the circuit X15 is supplied with the +B power source voltage during answering operation and during recording of an incoming message and thereby placed in the operable state, and the circuit X28 is placed in the operable state except at the time of starting of the answering operation. Particularly in the circuit X28, detecting operation becomes possible at the time of recording an incoming message and both detecting operation and storing operation become possible at the time of answering as described hereinafter.

When the calling party cuts off the telephone line during the operation of recording an incoming message, a click noise accompanying this hanging up action is sent through the telephone line to the telephone set operating cooperatively with the apparatus 10. This click noise is transmitted by way of the matching transformer T1 and the line *h* to the CPC circuit X15, in which this click noise is applied by way of a capacitor C2 to a semi-fixed variable resistor VR1 for sensitivity adjustment. A voltage led out from a movable terminal of this resistor VR1 is transmitted through a capacitor C3 and, after being rectified by a diode D5, is applied through a resistor R12 to the base of the transistor Tr3. In the apparatus of the instant embodiment, the resistance value of the variable resistor VR1 is so preset that the transistor Tr3 will become "ON" when the level of the click noise is above +10 dBm between the terminals L1 and L2.

When the transistor Tr3 becomes "ON," the signal which has been applied through the line *g* to the transistor Tr1 is grounded at the junction between the resistors R10 and R11 by way of a diode D6 and the transistor Tr3. Consequently, the transistor Tr1 becomes "OFF" since its bias voltage is cut off, and the transistor Tr2 also becomes "OFF." As a consequence, the relay becomes inoperative, and the relay contact point Sd1 is switched, whereby the apparatus 10 is disconnected from the telephone line. That is, when the caller replaces the receiver during the operation of recording of an incoming message, the apparatus 10 is immediately disconnected from the telephone line and then placed in the ready mode.

The operation of the apparatus in the case where the caller replaces the receiver while he is still listening to an answering message and has not heard the message to its end, that is, the endless tape 11 on the answering side is still traveling at an intermediate point of its cyclic path, is as follows. At the time of this answering operation, the circuit X10 is being supplied with a signal through the line *c* and is in the operative state as described above, and the transistors Tr1 and Tr2 are both being held in their "ON" state. As a consequence, the circuit X15 is supplied with the +B power source voltage and is in the operable state similarly as at the time of recording an incoming message.

A click noise which is produced similarly as at the time the caller cuts off the telephone line is transmitted through the line *h* to the transistor Tr3 similarly as described above, whereupon the transistor Tr3 is rendered "ON." At this time, the signal passing through the line *c* is restricted by the resistor R11 in being grounded by way of the transistor Tr3, and the circuit X10 remains in its operative state and continues to supply +B power source voltage to the circuit X15 and the relay 26. Consequently the relay 26 is held in its operating state and the relay contact Sd1 is held in its switched state to the line side. A diode having a cathode connected to the base side of the transistor Tr1 may be used in substitute for the resistor R11.

For this reason, the apparatus 10 remains connected to the telephone line, and when, with this apparatus in this state, a call is made to the telephone set for cooperatively operating with the apparatus 10, a signal signifying that the called party, that is, the called telephone set is busy is transmitted to the caller from the telephone exchange.

When the transistor Tr3 is rendered "ON," the transistor Tr4 is also placed in the "ON" state, its base being grounded by way of the resistors R8 and R7 and the transistor Tr3. The output current of the transistor Tr3 in the "ON" state is fed back by way of a diode D7, resistors R13 and R14, and a diode D8 to the base of the transistor Tr3. Consequently, the transistors Tr3 and Tr4 are both held in the "ON" state, and the circuit X28 for detecting and storing click noise operates to detect and store click noise.

Furthermore, in the case also where the caller cuts off his telephone line during the answering operation, the call answering circuit X7 is self-held in its operational state without being affected in any way by the resulting click noise, and the endless tape 11 on the answering side continues to be clamped and driven by a pinch roller and a capstan (both not shown) driven by the motor 19. The message reproduced at this time is sent by way of the telephone line to the side of the telephone exchange but is not sent to the caller.

When the endless tape 11 has completed one cycle of its travel and the circuit X3 operates similarly as described hereinbefore, the call answering circuit X7 is rendered inoperative, and the control circuit X14 is rendered operative. The apparatus 10 is thus changed from the answering mode to the mode for recording incoming messages. When the circuit X7 becomes inoperative, the signal passing through the line *c* is no longer sent to the circuit X10, and the transistor Tr1 becomes "OFF." Consequently, the transistor Tr2 becomes "OFF," and the circuit X10 is rendered inoperative. As a consequence, the relay RL26 is cut off from its current supply and is rendered inoperative, and the relay contact point Sd1 is switched. The apparatus 10 is thereby disconnected from the telephone line and is placed in the original ready state with the endless tape 11 set in its starting position.

In addition, during the operation of the circuit X28, the output of the transistor Tr4 is charged beforehand in a capacitor C4 by way of a charging circuit comprising the diode D7 and the resistor R13. For this reason, when the transistor Tr2 becomes "OFF" and the power supply from the circuit X10 to the circuit X15 is cut off, the charge stored in the capacitor C4 and discharged through a discharging circuit comprising the resistor R14 and the diode D8 is applied to the base of the transistor Tr4, which is thereby held in a biased state for a required time. At this time, the charge in the capacitor C4 is conducted by way of a resistor R15 to ground.

Accordingly, when the transistor Tr2 becomes "OFF" in the apparatus 10 of the present invention, the control circuit X14 becomes inoperative with a certain time delay relative thereto, and the signal passing through the line *g* to the circuit X10 disappears, but a signal still supplied for a very short time through the line *g* after the transistor Tr2 becomes "OFF" is not applied to the transistor Tr1 but is conducted by way of the diode D6 and the transistor Tr3 to ground. Therefore, the transistor Tr2, after once becoming "OFF," is not placed again in the "ON" state by the signal still applied for a short time through the line *g*, and the undesirable connection again of the telephone line is prevented.

In the above described embodiment, silicon transistors are used for the transistors Tr1 through Tr4, and silicon diodes are used for the diodes D1 through D9. The resistance values of the resistors R1 through R20 and the capacitance values of the capacitors C1 through C6 in the circuit shown in FIG. 3 are as follows.

Resistors:

| | | | | | |
|---|---|---|---|---|---|
| R1 | 2.2 | kΩ | R11 | 3.3 | kΩ |
| R2 | 5 | kΩ | R12 | 33 | kΩ |
| R3 | 1 | kΩ | R13 | 470 | Ω |
| R4 | 10 | kΩ | R14 | 47 | kΩ |
| R5 | 1 | kΩ | R15 | 47 | kΩ |
| R6 | 10 | kΩ | R16 | 4.7 | kΩ |
| R7 | 1 | kΩ | R17 | 6.8 | kΩ |
| R8 | 6.8 | kΩ | R18 | 1 | kΩ |
| R9 | 8.2 | kΩ | R19 | 47 | kΩ |
| R10 | 5.6 | kΩ | R20 | 10 | kΩ |

Capacitors:

| | | | | | |
|---|---|---|---|---|---|
| C1 | 3.3 | μF | C4 | 1 | μF |
| C2 | 10 | μF | C5 | 3.3 | μF |
| C3 | 10 | μF | C6 | 0.01 | μF |

Further, this invention is not limited to these embodiments but various variations and modifications may be made without departing from the scope and spirit of the invention.

What is claimed is:

1. In an automatic telephone answering apparatus of the type operating in response to an incoming call arriving through a telephone line from a caller to reproduce an answering message previously recorded on a recording medium and to send out the reproduced signal to a telephone line, the combination of:

telephone line connecting means operating in response to the incoming call to connect the apparatus to the telephone line;

detection and storing means for detecting and storing an indication that the caller has replaced his telephone receiver on its cradle to cut off the telephone line connection of the caller side; and control means for holding the telephone line connecting means in its operative state of connecting the apparatus to the telephone line until the apparatus places the recording medium in a state wherein the answering message can be reproduced from the starting point thereof even when the detection and storing means operates when the apparatus is in an intermediate point in its answering operation and for releasing thereafter the telephone line connecting means from its operative state.

2. An automatic telephone answering apparatus as set forth in claim 1 in which the control means comprises message starting point detecting means for detecting the placement of the recording medium in its state wherein the answering message can be reproduced from its starting point and producing a detection signal and disconnecting means operating upon receiving said detection signal, with the detection and storing means in its detection and storing state, to place the telephone line connecting means in the inoperative state thereof.

3. An automatic telephone answering apparatus as set forth in claim 1 in which the control means comprises detection means for detecting the answering message starting point, first activating means operating in response to the incoming call to place the telephone line connecting means in its operative state prior to the operation of the detection means during the answering operation of the apparatus, second activation means for causing the telephone line connecting means to continue to be in its operative state after the operation of the detection means, and suppressing means operating in response to an operation of the detection and storing means to suppress the action of the second activating means causing the telephone line connecting means to operate.

4. An automatic telephone answering apparatus as set forth in claim 3 in which there is further provided means for causing the detection and storing means to be held in its operative state over a further, very short, specific time after the telephone line connecting means has been converted into its inoperative state by the control means, and the suppressing means suppresses the operation with respect to the telephone line connecting means due to the second activating means during said specific time after the conversion of the telephone line connecting means into its inoperative state.

5. An automatic telephone answering apparatus as set forth in claim 3 in which the suppressing means comprises circuit means for grounding an output from the second activating means and circuit opening and closing means for opening the circuit means prior to the operation of the detection and storing means and closing the circuit means as a result of the operation of the detection and storing means, and the output of the second activating means is grounded by the circuit means closed by the circuit opening and closing means.

6. An automatic telephone answering apparatus as set forth in claim 3 in which there is further provided means for regulating the supplying of a signal from the first activating means to the suppressing means side, and the first activating means causes the telephone line connecting means to operate unrelatedly to the operative and inoperative states of the suppressing means.

7. An automatic telephone answering apparatus as set forth in claim 1 in which there are further provided a relay for closing a telephone line operating in response to the operation of the telephone line connecting means and holding means for causing the detection and storing means to be held in its inoperative state after the operation of the telephone line connecting means at least until said relay operates, and the holding means prevents the detection and memory means from carrying out erroneous operations as a result of a signal which is generated when the relay operates and is equivalent to a signal generated when the caller replaces his telephone receiver on its cradle to cut off his telephone line.

8. In an automatic telephone answering and recording apparatus operating in response to an incoming call arriving through a telephone line from a caller to reproduce an answering message previously recorded on a recording medium, sending out the reproduced message to a telephone line, and then to record any incoming message from the caller on a separate recording medium, the combination of:

telephone line connecting means operating in response to the incoming call to connect the apparatus to the telephone line;

detection and storing means for detecting and storing an indication that the caller has replaced his receiver on its cradle to cut off the telephone line;

control means for holding the telephone line connecting means in its operative state of connecting the apparatus to the telephone line until the apparatus places the recording medium in a state wherein the answering message can be reproduced from the starting point thereof even when the detection and storing means operates when the apparatus is in an intermediate point in its answering operation and for releasing thereafter the telephone line connecting means from its operative state; and recording means operating upon completion of the answering operation of the apparatus in the case where the detection and storing device does not operate during an intermediate point in the answering operation.

* * * * *